US011338715B2

(12) United States Patent
Gummin et al.

(10) Patent No.: US 11,338,715 B2
(45) Date of Patent: May 24, 2022

(54) SHAPE MEMORY ALLOY LATCH RELEASE MECHANISM FOR VEHICLE HEAD RESTRAINT

(71) Applicants: Mark A. Gummin, Silverton, OR (US); Mark Leonard Little, Maidstone (CA)

(72) Inventors: Mark A. Gummin, Silverton, OR (US); Mark Leonard Little, Maidstone (CA)

(*) Notice: Subject to any disclaimer, the term of this patent is extended or adjusted under 35 U.S.C. 154(b) by 42 days.

(21) Appl. No.: 16/886,008

(22) Filed: May 28, 2020

(65) Prior Publication Data

US 2021/0370816 A1 Dec. 2, 2021

(51) Int. Cl.
*B60N 2/844* (2018.01)
*B60N 2/853* (2018.01)
*B60N 2/856* (2018.01)

(52) U.S. Cl.
CPC ............. *B60N 2/853* (2018.02); *B60N 2/844* (2018.02); *B60N 2/856* (2018.02)

(58) Field of Classification Search
CPC ........ B60N 2/838; B60N 2/841; B60N 2/844; B60N 2/874
See application file for complete search history.

(56) References Cited

U.S. PATENT DOCUMENTS

| | | | | |
|---|---|---|---|---|
| 7,758,121 B2 * | 7/2010 | Browne | ................... | B60R 7/043 297/284.11 |
| 8,998,320 B2 * | 4/2015 | Mankame | ............ | B60N 2/0224 297/284.11 |
| 2007/0188004 A1 * | 8/2007 | Browne | .................... | A47C 7/38 297/391 |
| 2007/0246979 A1 * | 10/2007 | Browne | ................. | B60N 2/885 297/216.12 |
| 2008/0100118 A1 * | 5/2008 | Young | .................... | B60N 2/888 297/404 |
| 2010/0283305 A1 * | 11/2010 | Yetukuri | ................ | B60N 2/847 297/408 |
| 2013/0140866 A1 * | 6/2013 | Yetukuri | ................ | B60N 2/844 297/408 |
| 2015/0266401 A1 * | 9/2015 | Grable | ................... | B60N 2/856 297/408 |
| 2018/0134191 A1 * | 5/2018 | Ketels | .................. | B60N 2/0224 |
| 2020/0031264 A1 * | 1/2020 | Jiang | ...................... | B60N 2/874 |
| 2021/0009020 A1 * | 1/2021 | Jang | ........................ | B60N 2/844 |

FOREIGN PATENT DOCUMENTS

WO WO-2018076223 A1 * 5/2018 ............. B60N 2/874

* cited by examiner

*Primary Examiner* — Timothy J Brindley
(74) *Attorney, Agent, or Firm* — Howard Cohen

(57) ABSTRACT

An automotive head restraint apparatus includes a housing having a padded and upholstered exterior, the housing being rotatable about a lateral support tube that supports a lock plate having a lobe extending radially with a detent slot extending therein. A latch finger extends from a pivotable lock lever plate to releasably engage in the detent slot to latch the housing in the deployed position. A pull rod is secured to the lock lever plate, and is connected to a release lever arm at its other end. A shape memory alloy (SMA) wire loop is passed about a drive pulley that is supported by a reciprocally translatable slide. A drive arm extends from the slide to impinge on the release lever and raise the pull rod when the SMA wire loop is energized and contracted, thereby releasing the latch finger to rotate the housing to the retracted position.

19 Claims, 5 Drawing Sheets

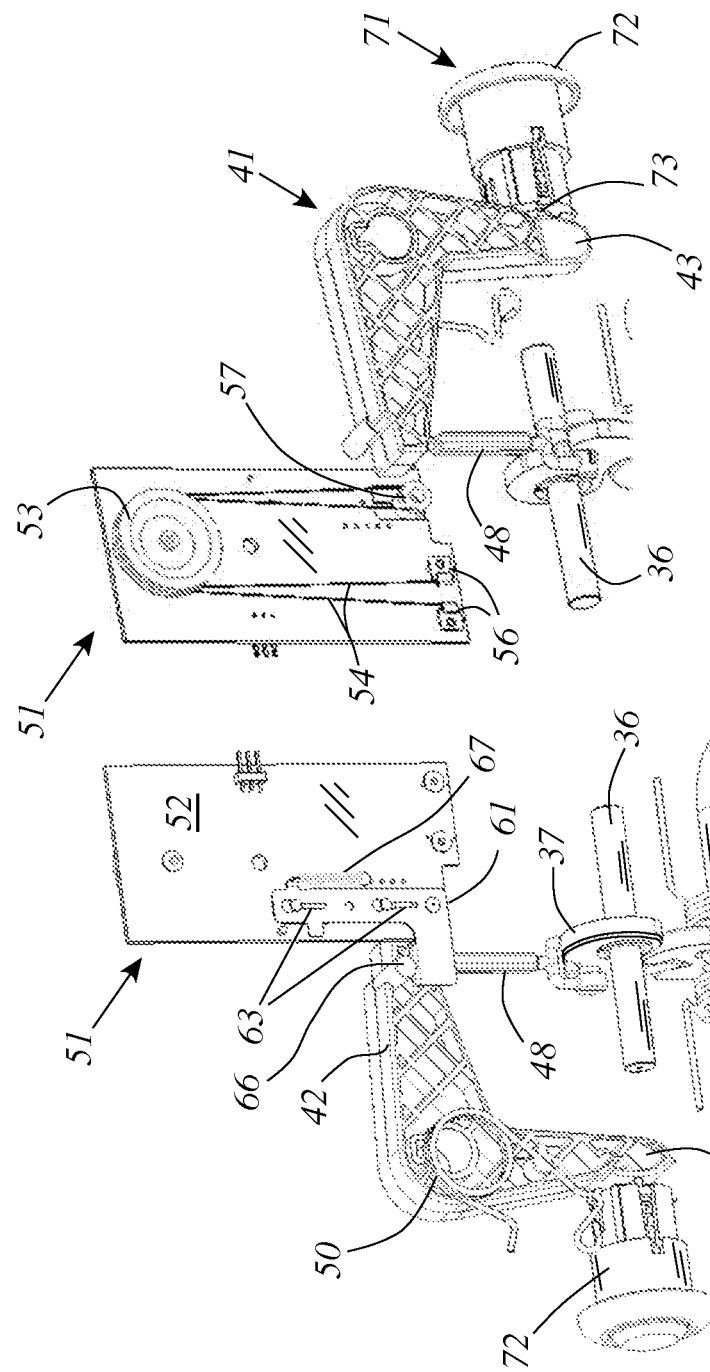

SHAPE MEMORY ALLOY LATCH RELEASE MECHANISM FOR VEHICLE HEAD RESTRAINT

CROSS-REFERENCE TO RELATED APPLICATIONS

This utility patent application claims the priority date of U.S. Provisional Patent Application 62/854,784, filed May 30, 2019.

FEDERALLY SPONSORED RESEARCH

Not applicable.

SEQUENCE LISTING, ETC ON CD

Not applicable.

BACKGROUND OF THE INVENTION

Field of the Invention

This invention relates to an automotive head restraint latch release mechanism and, more particularly, to a method and apparatus for operating the latch release mechanism using a shape memory alloy actuator.

Automotive seat head restraints, also termed headrests in the present description, serve primarily to protect the seat occupant from injuries such as whiplash during crash events. They also provide support and restraint when the occupant rests fully back into the seat. But as modern vehicles are required provide safety headrests for all passengers, and with several rows of seats in many popular models, the headrests also reduce the rear- and side visibility of the driver. This lack of situational awareness in itself is a safety concern. And it is evident that the back seats of many vehicles are not used very often, leading to obstructed visibility without any benefit, unless the driver takes the time and effort to rotate, lower, or otherwise remove the head rests whenever the back seats are empty.

Furthermore, in some vehicle models the head rests extending upwardly in the deployed positions from the tops of the second row seats may obstruct the ability to rotate the seat backs downwardly to form a load space with a generally flat floor surface. In this circumstance it is absolutely necessary to retract all the rear seat head rests before stowing the seat backs, and doing this task manually only makes the task more arduous.

It is therefore becoming increasingly popular to provide an electronic means to lower the head rests to improve driver visibility when rear seats are unoccupied. One can envision fully controllable up/down or tilt-forward/back mechanisms that could perform those functions, but a more space and cost-effective approach is to employ a spring-loaded latch release mechanism with an electronic actuator to lower the headrests at the push of a button. Thus the head rests may be lowered virtually instantaneously without any substantial effort, and may be re-deployed (raised or extended) by manually engaging and raising the head rests; i.e., when the rear seats are going to be occupied.

There are known in the prior art many mechanical and electromechanical arrangements for lowering or retracting the head rests in a vehicle. One type of device employs an electromagnetic latch release that is mounted in the head rest connected through a switch or command input to the vehicle power system. Although this expedient is effective, the electromagnet generally requires a coil of wire and an iron core, both of which have substantial mass and weight. Likewise, another mechanism for this purpose involves a solenoid actuator mounted in the seat back and connected to the head rest release mechanism by a bicycle cable. Here again, there is a substantial mass and weight added to the vehicle cabin furnishings, and an extensive mechanical layout that is subject to failure.

SUMMARY OF THE INVENTION

The present invention generally comprises an vehicle head restraint apparatus that includes a latch for maintaining the head restraint in a deployed position, and a release mechanism that moves the head restraint to a retracted position. The apparatus includes a housing having an exterior that supports the padding, cushioning, upholstery, and related external appurtenances of the head restraint. A pair of vertical support tubes extend upwardly from a seat back or the like, and are joined by a lateral support tube, and the housing encloses the lateral support tube and includes interior surface to engage the lateral support tube in rotatable fashion. At least one coil spring is secured about the lateral support tube to impinge on the housing and resiliently bias it to rotate to the retracted position.

A lock plate is secured to the lateral support tube, and includes a lobe extending radially and eccentrically and having a detent slot extending into a peripheral edge thereof. A lock lever pivot shaft is secured in the housing adjacent to the lateral support tube, and a lock lever plate is secured to the pivot shaft in rotatable fashion in a generally coplanar relationship to the lock plate. A latch finger extends from the lock lever plate to releasably engage in the detent slot to latch the housing in the deployed position. A pull rod is secured at one end to a yoke attached to the lock lever plate, and is connected to a release lever arm at its other end. A shape memory alloy (SMA) wire loop has opposed ends secured to adjacent electrical terminals, and the loop is passed about a drive pulley that is supported by a reciprocally translatable slide. A drive arm extends from the slide to impinge on the release lever and raise the pull rod, thereby causing the latch finger to withdraw from the detent slot and free the housing to rotate about the lateral support tube to the retracted position.

A pushbutton assembly is also secured in the housing, and includes a depressible cap that is connected to a plunger that impinges on the release lever. Manually depressing the cap drives the plunger to rotate the release lever and carry out the release of the latch finger from the detent slot so that the housing will rotate to the retracted position under manual command.

BRIEF DESCRIPTION OF THE DRAWING

FIGS. 5A and 5B are enlarged front and rear perspective views, respectively, that isolated the release lever, latch assembly, and SMA actuator components of the head restraint assembly.

DETAILED DESCRIPTION OF THE INVENTION

Figure 1C:
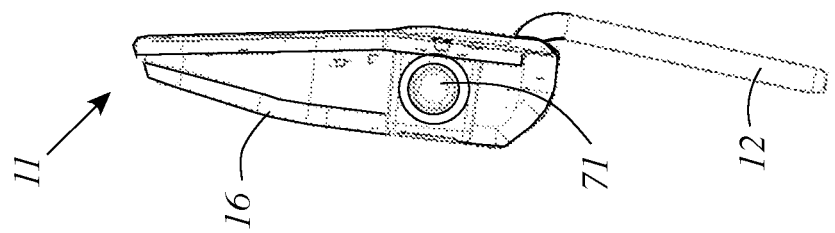
FIG. 1C is a side elevation of the head restraint assembly in the deployed position.

With regard to the accompanying figures, a typical head rest assembly 11 for a vehicle includes a pair of laterally spaced vertical support tubes 12 extending upwardly from the top of the seat back. A lateral support tube 13 extends between the two vertical tubes, and the tubing sections 12 and 13 may be integrally formed from a single tube. A head rest (head restraint) housing assembly 16 is mounted on the lateral support tube 13 by a head rest pivot arrangement (described below) that enables the head rest to rotate reversibly from a substantially upright near-vertical position (deployed) shown in FIG. 1C to a substantially horizontal position (stored or retracted) shown in FIG. 1A that minimizes obstruction of view past the head rest assembly. Further mechanical appurtenances (not shown) may be provided to enable angular adjustment of the head rest in the deployed position.

The housing assembly 16 is generally comprised of a molded plastic housing 17 and a cover 18, both components having the same outer shape and edge conformations so that the two components may be joined together edge-to-edge about their perimeters to form a continuous closure. The interior opposing surfaces of the housing 17 and cover 18 include surfaces, features, recesses, and openings disposed to act cooperatively to support the components of the apparatus as described below, and to enable their functions, movement, and the like. Upholstery fabric, padding, shaped resilient components, and the like are added to the exterior of the housing assembly 16, but are not shown herein to simplify visualization of the apparatus.

Figure 1B:
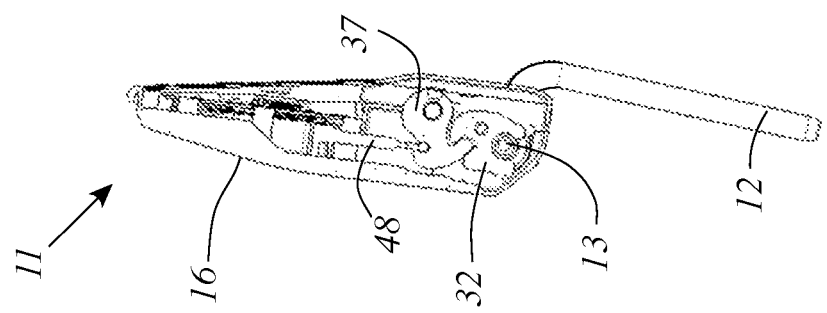
FIG. 1B is a cross-sectional side elevation of the head restraint assembly in the deployed position, taken along line 1B-1B of FIG. 2.
Figure 1A:
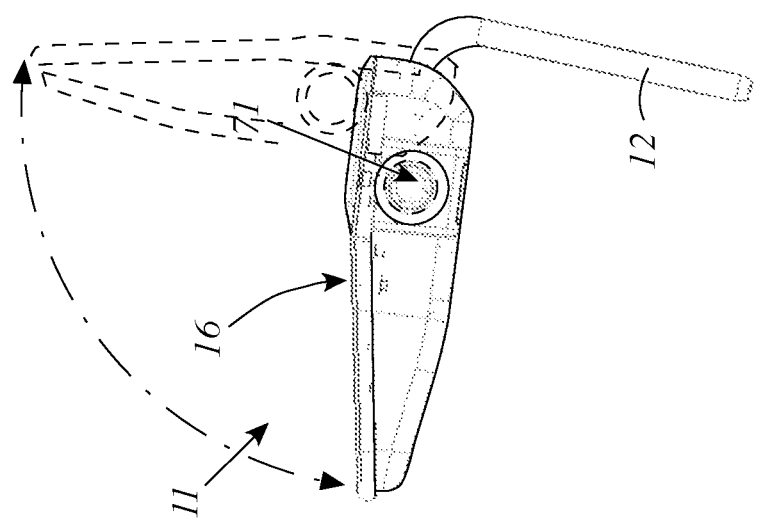
FIG. 1A is a side elevation of a head restraint assembly of the present invention disposed in the stored position.
Figure 3:
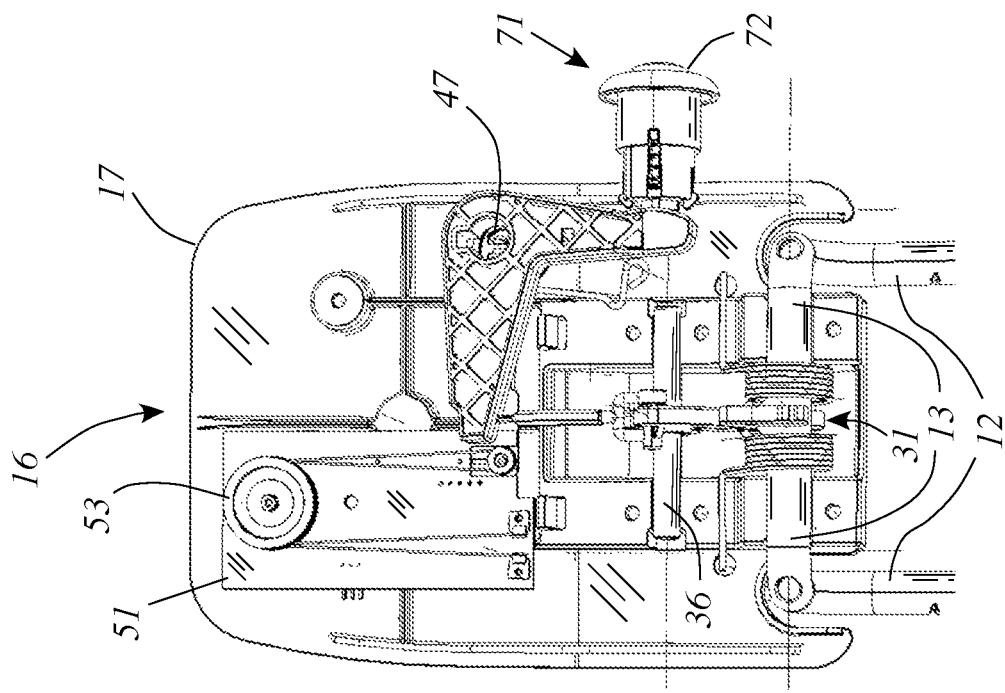
FIG. 3 is a rear elevation of the head restraint assembly with the cover removed to display the interior components.
Figure 2:
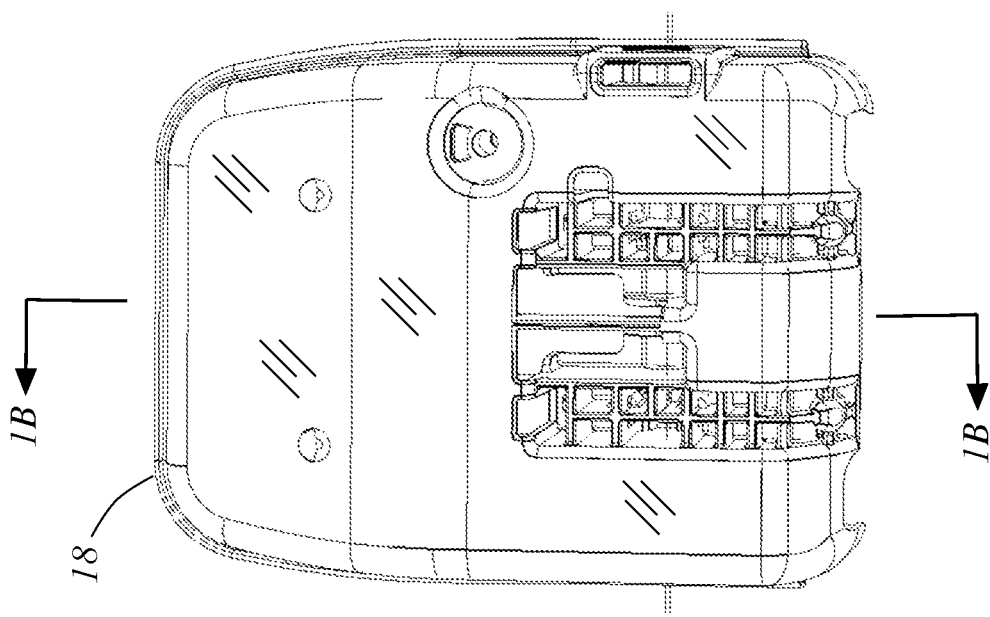
FIG. 2 is a rear elevation of the head restraint housing in the deployed position as depicted in FIGS. 1B and 1C.
Figure 4:
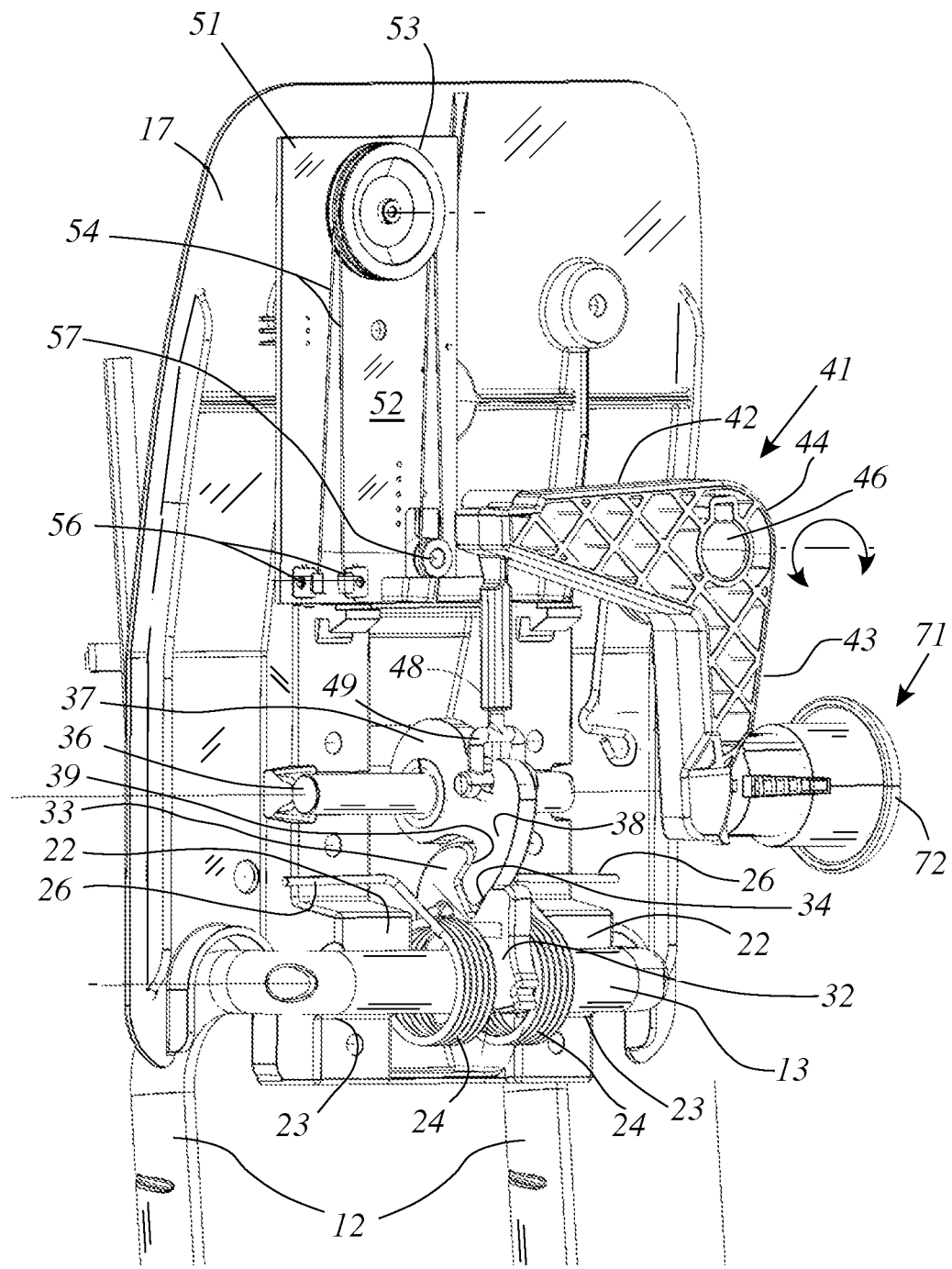
FIG. 4 is a perspective view of the head restraint assembly as depicted in FIG. 3.

With regard to FIGS. 3 and 4, the housing interior includes a pair of journal blocks 22 having a lateral passage 23 therethrough to receive the lateral support tube 13 in rotatable fashion, thus enabling the housing assembly 16 to move angularly between the retracted and deployed positions of FIGS. 1A and 1C. A pair of helical coil springs 24 are secured about the support tube 13 adjacent to the blocks 22, with one end of each spring secured to the tube 13 and the other end 26 impinging on a portion of the interior 17 the housing. The springs 24 deliver a resilient restoring force that urges the housing assembly 16 to rotate toward the retracted disposition of FIG. 1A.

Also disposed within the housing assembly 16 is a latch mechanism 31 that is designed to releasably secure the housing assembly 16 in the deployed position. With regard to FIGS. 3 and 4, the latch mechanism 31 includes a lock plate 32 disposed between the springs 24 and secured to the lateral support tube 13. The lock plate 32 includes a lobe 33 extending radially and eccentrically outwardly from the lateral tube 13, with a detent slot 34 extending into the upper edge portion of the lobe 33. A lock lever pivot shaft 36 is secured in the housing, generally parallel with the lateral support tube 13 and proximate thereto. A lock lever plate 37 is secured to the shaft 36 in rotatable fashion in a generally coplanar relationship to plate 32. A lobe 38 extends radially and eccentrically from the edge of plate 37, with a latch finger 39 extending from the lobe 38. The finger 39 is shaped and dimensioned to be releasably engaged in the detent slot 34 of lock plate 32, an engagement that prevents rotation of the housing assembly 16 about the lateral support tube 13.

The latch mechanism 31 further includes a release lever 41 comprised of arms 42 and 43 extending from a central web portion 44 in a common plane, with the arms 42 and 43 oriented in a generally orthogonal relationship. An opening 46 in the web portion 44 engages a pivot lug 47 projecting in the interior of the housing so that the release lever 41 may rotate in a limited angular excursion. Torsion spring 50 is disposed about the pivot lug 47 and is connected between the release lever 41 and the housing to resiliently bias the A pull rod 48 is joined at its lower end to a yoke 49 that is pivotally secured to lobe 38 of the lock lever plate, and at its upper end to the distal end of arm 42 of the release lever 41. Rotation of the release lever 41 in the clockwise direction (as viewed in FIGS. 3 and 4) translates the pull rod 48 upwardly, rotating the lock lever plate 37 about shaft 36 and releasing latch finger 39 from detent slot 34. The restoring forces of springs 24 are then free to rotate the housing assembly 16 about the lateral support tube 13 so that the assembly moves into the disposition of FIG. 1.

The latch mechanism 31 also includes an electrically driven actuator 51 arranged to rotate the release lever 41 and effect the latch release action described above. The actuator 51 includes a stiff panel or board 52, such as a printed circuit board, with a pulley wheel 53 rotatably secured to one end of the board. A length of shape memory alloy (SMA) wire 54 is secured to the board, with the ends of the wire anchored in adjacent electrical terminals 56. The wire 54 is formed in a loop, with the distal portion of the loop secured about drive pulley 57. Note that the pulley wheel 53 is provided with two adjacent annular grooves in the periphery thereof the maintain spacing and separation of the wire portions from their adjacent counterparts.

Figure 6A:
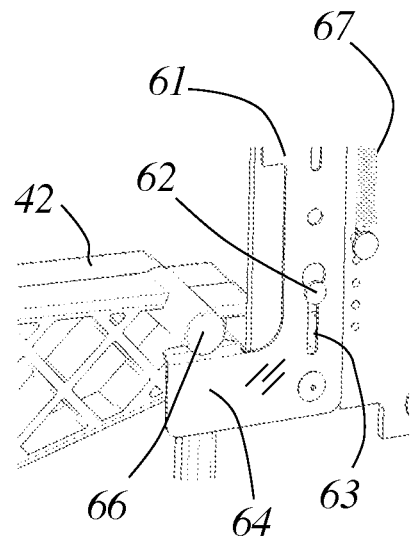
FIGS. 6A and 6B are enlarged rear perspective views of the engagement of the SMA actuator drive arm and the release lever of the head restraint latch.
Figure 6B:
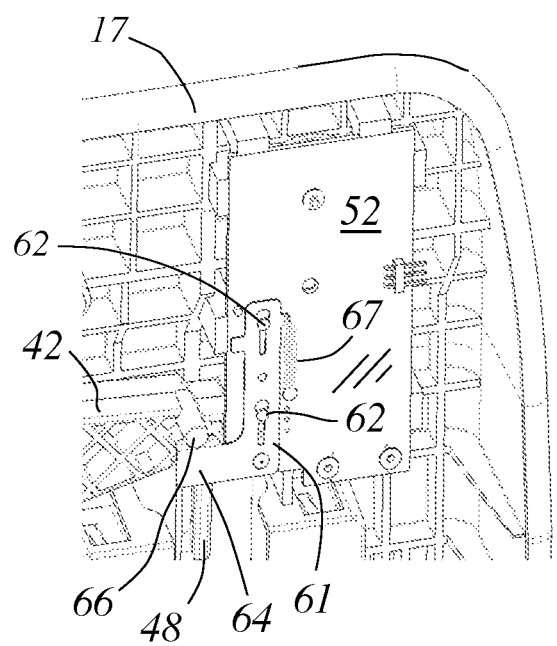

With regard to FIGS. 5A and 6A in particular, the actuator 51 also includes a slide 61 that is secured to the board 52 by posts or rivets 62 extending from the board through vertical slots 63 in the slide. The slots 63 enables translation of the slide in a vertical direction that is generally parallel to the axis of the pull rod 48. The drive pulley 57 is mounted on the lower extent of the slide 61, whereby actuation of the SMA wire causes it to contract and draw the slide to translate upwardly. A drive arm 64 extends laterally from the slide 61 and is disposed to impinge on a follower pin 66 that projects from the distal end of arm 42 of release lever 41. A tension spring 67 is connected between the board 52 and slide 61 to resiliently bias the slide downwardly toward the unactuated position.

The actuator 51 is activated by applying an electrical current to SMA wire 54 through contacts 56 to heat the wire, which causes it to contract when it surpasses a temperature threshold, which may be in the range of 75°-85° C. The contraction of the wire 54 applies tensile force to drive pulley 57, causing the slide 61 to translate linearly upwardly. The drive arm 64 of slide 61 urges the follower pin 66 upwardly, thus rotating the release lever 41 and moving the pull rod 48 to rotate the lock lever plate 37 and release the detent engagement of finger 39 in slot 34. The detent mechanism is opened to enable the springs 24 to rotate the housing 51 to the retracted position of FIG. 1A.

The housing 51 is restored to the upright deployed position by manually rotating the housing about the lateral support tube 13. Finger 39 is urged by the spring forces to re-engage detent slot 34 to re-latch the housing in the upright position.

The housing 51 further includes provisions to enable manual release of the latch mechanism 31 whenever desirable or necessary. A pushbutton assembly 71 is secured in a sidewall portion of housing 17, and includes a cap 72 reciprocally translatably mounted on a cylindrical housing. The cap 72 is resiliently biased to extend outwardly, and a central plunger 73 is joined to the cap 72. The inner end of plunger 73 impinges on a distal portion of arm 43 of release lever 41. When the cap 72 is pressed inwardly against its spring bias, the plunger 73 urges the distal end of arm 43 to rotate clockwise (as viewed in FIGS. 3, 4, and 5B). The pull rod 48 is translated upwardly to rotate the lock lever plate 37 and release the detent engagement of finger 39 in slot 34. The detent mechanism is opened to enable the springs 24 to rotate the housing 51 to the retracted position of FIG. 1A. Note that since the follower pin 66 is not connected to arm 64 of slide 61, no movement or force is applied to the actuator 51 when manual operation of the latch mechanism is carried out.

The SMA latch release actuator is driven by power supplied through a power/control cable that may be routed from the vehicle electrical power system through a vertical support tube and lateral support tube to the head rest. The SMA latch release actuator may be activated by remote command, using a standard communications protocol function that is built into the latch release actuator. This may be accomplished by, e.g., employing a button or touch pad on the dashboard of the vehicle, or through a personal communications device that is equipped to interact with the communications module of the actuator. The board 52 may include a microprocessor that is programmed to manage the application of electrical power to the SMA wire 54, and to respond to communications protocols from the vehicle or the driver's commands. Note that the use of an SMA wire loop 54 serves to double the force generated by contraction of the wire when heated beyond the threshold temperature, and also enables connecting the wire ends to fixed electrical terminals, so that any moving electrical contact is eliminated.

In an alternative embodiment, an electrical pushbutton may be provided in the head restraint assembly in addition to or in substitution to the manual pushbutton assembly 71. The electrical pushbutton is connected in the power circuit to the SMA actuator 51, and may be employed to drive the SMA actuator to operate the latch release mechanism and lower the housing from the deployed to the retracted position.

While the foregoing description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A vehicle head restraint apparatus, including:
   a housing rotatably secured to a lateral support member that is supported on a seat back;
     at least one biasing spring for urging said housing to rotate about said lateral support member to a retracted rotated position;
     a lock plate secured to said lateral support member and including a detent slot formed therein;
     a lock lever plate rotatably secured in said housing adjacent to said lock plate, said lock lever plate including a latch finger disposed to releasably engage with said detent slot to secure said housing in a deployed rotated position;
   a shape memory alloy (SMA) wire actuator operatively connected between said housing and said lock lever plate, said SMA wire actuator being operable to contract and rotate said lock lever plate to release said latch finger from said detent slot and free said housing to rotate to said retracted position;
   wherein said SMA wire actuator includes an SMA wire having opposed ends connected to fixed, adjacent electrical terminals, said wire being formed as a loop having a distal loop end.

2. The vehicle head restraint apparatus of claim 1, wherein said distal loop end is secured about a drive pulley mounted on a translatable slide within said housing.

3. The vehicle head restraint apparatus of claim 2, further including a pull rod connected at one end to said lock lever plate, and at the other end to a release lever rotatably secured in said housing.

4. The vehicle head restraint apparatus of claim 3, further including a drive arm extending from said slide to impinge on said release lever, whereby activation of said SMA wire translates said slide and urges said drive arm to impinge on and rotate said release lever and translate said pull rod to release said latch finger from said detent slot.

5. The vehicle head restraint apparatus of claim 1, further including a rigid board supporting said pair of adjacent electrical terminals.

6. The vehicle head restraint apparatus of claim 5, wherein said rigid board includes conductor traces to deliver electrical power to said terminals.

7. The vehicle head restraint apparatus of claim 6, further including a pulley wheel rotatably secured to said rigid board, said loop including adjacent wire legs extending about a peripheral portion of said pulley from said terminals to said distal loop end.

8. The vehicle head restraint apparatus of claim 7, wherein said pulley wheel further includes adjacent annular grooves, each engaging one of said adjacent legs, whereby said wire legs are maintained in spaced apart, non-contact fashion with each other.

9. The vehicle head restraint apparatus of claim 8, further including a slide secured to said rigid board in reciprocally translatable fashion, and a drive pulley extending from said slide, said loop end of said SMA wire secured about said drive pulley.

10. A vehicle head restraint apparatus, including:
    a housing rotatably secured to a lateral support member that is supported on a seat back;
    at least one biasing spring for urging said housing to rotate about said lateral support member to a retracted rotated position;
    a lock plate secured to said lateral support member and including a detent slot formed therein;
    a lock lever plate rotatably secured in said housing adjacent to said lock plate, said lock lever plate including a latch finger disposed to releasably engage with said detent slot to secure said housing in a deployed rotated position;
    a shape memory alloy (SMA) wire actuator operatively connected between said housing and said lock lever plate, said SMA wire actuator being operable to contract and rotate said lock lever plate to release said latch finger from said detent slot and free said housing to rotate to said retracted position;

further including a release lever rotatably secured in said housing, said release lever including a first lever arm, and a pull rod joined between said first lever arm and said lock lever plate.

11. The vehicle head restraint apparatus of claim 10, wherein rotation of said release lever translates said pull rod to release said latch finger from said detent slot.

12. The vehicle head restraint apparatus of claim 11, wherein said release lever includes a second lever arm, and further including a pushbutton assembly secured in said housing and having a pushbutton extending from said housing, and a plunger disposed to impinge on and rotate said second lever arm when depressed to manually release said latch finger from said detent slot.

13. The vehicle head restraint apparatus of claim 12, further including a yoke joined between said pull rod and said lock lever plate.

14. A vehicle head restraint apparatus, including:
a housing rotatably secured to a lateral support member that is supported on a seat back;
 at least one biasing spring for urging said housing to rotate about said lateral support member to a retracted rotated position;
 a lock plate secured to said lateral support member and including a detent slot formed therein;
 a lock lever plate rotatably secured in said housing adjacent to said lock plate, said lock lever plate including a latch finger disposed to releasably engage with said detent slot to secure said housing in a deployed rotated position;
 a release lever including a first lever arm and a second lever arm extending from a central web portion that is rotatably secured to said housing;
 a pull rod extending from said first lever arm and joined to a yoke extending from said lock lever plate, whereby rotation of said release lever in a first direction translates said pull rod to rotate said lock lever plate and release said latch finger from said detent slot;
 a push button assembly mounted on said housing and including a plunger impinging on said second lever arm to rotate said release lever in said first direction by manual activation;
 a shape memory alloy (SMA) wire actuator secured to said housing and including a drive arm extending therefrom in reciprocally translating fashion, said drive arm impinging on said first lever arm and disposed to rotate said release lever in said first direction when said actuator is activated.

15. The vehicle head restraint apparatus of claim 14, wherein said SMA actuator includes an SMA wire formed as a loop having a distal loop end that is operatively secured to said drive arm.

16. The vehicle head restraint apparatus of claim 15, wherein said loop includes opposed wire ends, a pair of fixed, adjacent electrical terminals disposed within said housing, said opposed wire ends each secured to a respective electrical terminal.

17. The vehicle head restraint apparatus of claim 16, further including a pulley wheel rotatably secured within said housing, said SMA wire loop having adjacent legs extending about a peripheral portion of said pulley wheel.

18. The vehicle head restraint apparatus of claim 17, wherein said pulley wheel further includes adjacent annular grooves, each engaging one of said adjacent legs, whereby said wire legs are maintained in spaced apart, non-contact fashion with each other.

19. The vehicle head restraint apparatus of claim 14, further including a pivot shaft disposed within said housing adjacent to said lateral support member, said lock lever plate supported on said pivot shaft in rotatable fashion.

* * * * *